United States Patent [19]
Alarcon et al.

[11] Patent Number: 5,429,811
[45] Date of Patent: Jul. 4, 1995

[54] PROCESS FOR THE THERMOCHEMICAL DECOMPOSITION OF DINITROGEN OXIDE

[75] Inventors: Jean-Michel Alarcon, Trosly Breuil; Norbert Gonzalez-Flesca, Aulnay-Sous-Bois, both of France

[73] Assignee: Societe Francaise Hoechst, Puteaux, France

[21] Appl. No.: 16,141

[22] Filed: Feb. 5, 1993

[30] Foreign Application Priority Data

Feb. 7, 1992 [FR] France ............................. 92 01413

[51] Int. Cl.$^6$ ...................... B01D 53/56; C01B 21/22; C01B 21/20; C01B 21/24
[52] U.S. Cl. .................... 423/235; 423/400; 423/405
[58] Field of Search ............ 423/239, 239 A, 235, 423/405, 400

[56] References Cited

U.S. PATENT DOCUMENTS

| | | | |
|---|---|---|---|
| 3,797,415 | 3/1974 | Young, Jr. et al. | 110/8 C |
| 4,973,457 | 11/1990 | Kongshaug et al. | 423/239 |
| 5,043,150 | 8/1991 | Hiltunen et al. | 423/239 |
| 5,133,950 | 7/1992 | Oakes et al. | 423/239 |
| 5,200,162 | 4/1993 | Riley et al. | 423/239 |

FOREIGN PATENT DOCUMENTS

| | | |
|---|---|---|
| 359286 | 3/1990 | European Pat. Off. . |
| 257940 | 5/1985 | Japan . |
| 325475 | 2/1930 | United Kingdom . |

OTHER PUBLICATIONS

English-language translation of Japanese Kokai patent document 61-257,940 (Sakamoto), published Nov. 15, 1986.

F. A. Cotton, G. Wilkinson "Basic Inorganic Chemistry", John Wiley & Sons, New York; 16-5: Nitrogen oxides 1976 no month.

Database WPIL, week 8652, Derwent Publications Ltd., London, GB; AN 86-343366/52 & JP-A-61 257 940 (Asahi Chemical Ind. KK) 15 Nov. 1985; (abrege).

*Primary Examiner*—John Zimmerman
*Assistant Examiner*—Peter T. DiMauro
*Attorney, Agent, or Firm*—Browdy and Neimark

[57] ABSTRACT

Process for the thermochemical decomposition of dinitrogen oxide to products of general formula (I)

$$NO_x \quad (I)$$

x representing 1 or 2, wherein dinitrogen oxide is flame-treated, then the products of general formula (I) formed are recovered.

4 Claims, No Drawings

PROCESS FOR THE THERMOCHEMICAL DECOMPOSITION OF DINITROGEN OXIDE

The present invention relates to a process for the thermochemical decomposition of dinitrogen oxide.

Oxidation of various organic substrates with nitric acid liberates various nitrogen oxides, some of which may readily be enhanced in value or destroyed, such as nitrogen monoxide, nitrogen dioxide, or dinitrogen tetroxide. Other nitrogen oxides, however, particularly dinitrogen monoxide, are not directly recyclable.

Dinitrogen oxide $N_2O$, at ambient temperature, is a stable gas, hardly combining at all with molecular oxygen and is very resistant to the action of conventional oxidising agents. At high temperatures it is a remarkable oxidising agent, readily giving up its oxygen and liberating molecular nitrogen with substantial evolution of heat.

Certain chemical reactions such as the oxidation of acetaldehyde with nitric acid to glyoxal or oxidation of cyclohexanone with nitric acid to adipic acid liberate large quantities of dinitrogen oxide.

It is of great industrial interest, therefore, to be able to convert said dinitrogen oxide to nitrogen oxides with a higher oxidation number with a view to enhancing their value, particularly for the production of nitric acid.

From Japanese patent application no. 61-257,940 is known a thermal decomposition process which makes it possible to convert to nitrogen oxide the gaseous by-products ($N_2O$, NO, $NO_2$) formed during the oxidation of cyclohexanone and/or cyclohexanol with nitric acid to adipic acid, which process must imperatively be used in a piston reactor after the sum of the NO and $NO_2$ concentrations in the gaseous starting mixture has been reduced to less than 10%.

In order to become independent of this dual requirement which entails complex technology, the applicant has discovered, with surprise, a process which makes it possible to convert dinitrogen oxide to products of formula (I)

$$NO_x \quad\quad\quad (I)$$

wherein x represents 1 or 2.

The process according to the present invention is a thermochemical oxidation process wherein dinitrogen oxide is flame-treated, then the products of general formula (I) formed are recovered.

The flame may be obtained by conventional combustion of a mixture of oxidising and combustible gases such as molecular oxygen, dinitrogen oxide, natural gas, lower alkanes generally associated with a ballast composed of molecular nitrogen.

The gaseous mixture containing dinitrogen oxide is injected either into the flame or into the hot gases produced by the flame. In this latter case, injection is known as post combustion injection.

The above process is particularly applicable to gaseous mixtures, particularly industrial effluents containing dinitrogen oxide.

It is known that nitrogen monoxide, NO, at ambient temperature, in contact with oxygen, oxidises quantitatively, immediately and exothermally to nitrogen dioxide, $NO_2$. This reaction is in equilibrium, however, and it is accepted that at atmospheric pressure, above 620° C., a mixture of oxygen and NO may remain without giving rise to the slightest reaction. On the other hand, at ambient temperature, the reaction is complete and there is practically no more NO to be found. It is also known that nitrogen dioxide dimerises to dinitrogen tetroxide and that the lower the temperature, the more complete is said dimerisation. At ambient temperature and pressure, nitrogen dioxide is almost entirely dimerised to $N_2O_4$, dissolving very rapidly in water giving nitric acid and nitrous acid.

The process according to the invention consumes the dinitrogen oxide entirely. In fact, the gases, after flame treatment, contain practically no more dinitrogen oxide. It is thought that at the temperature of the flame, the dinitrogen oxide decomposes in particular to atomic oxygen, nitrogen monoxide and molecular nitrogen.

The process according to the present invention may advantageously be used continuously in a furnace fitted with a burner, one or more confinement chambers, and a device for injecting the effluent to be treated. At the outlet of the confinement chamber(s), the gases are cooled to ambient temperature, then the products of general formula (I) are recovered, advantageously by absorption in a wash tower in which circulates dilute nitric acid.

It is advantageous that the process of the present invention is used at atmospheric pressure.

The following examples illustrate the process of the present invention.

The furnace used in said examples is a cylindrical, vertical furnace with an internal diameter of 1300 mm and a height of 3500 mm. It has a power of 1 MW and is lined with refractory material. The burner is a turbulent burner with an adjustable element, known as a swirl, of the multi-fuel type with a dual air inlet. The confinement chambers, three in number, are cylindrical, vertical, lined with refractory material; the top part is fitted with a burner, the charging door, the ignition device and the flame detection cell; the middle part contains an injection device with alumina tubes embedded in the refractory material and the bottom part is straightforward. The assembly of confinement chambers measures 1400 mm in height and has a diameter of less than 450 mm. The flow rates of the gases are determined either with a rotameter or with a flow meter or with a Venturi meter. The gases, after reaction, are analysed with an infrared absorption analyser for carbon monoxide, carbon dioxide and dinitrogen oxide, and with a paramagnetic analyser for oxygen. The gases of general formula (I) are analysed by acidimetry after oxidation with oxygen, then with hydrogen peroxide.

The dinitrogen oxide destruction yield is calculated as follows:

$$R(\%) = 100 \left[ 1 - \left( \frac{[N_2O]^* \cdot DT}{[N_2O]DE} \right) \right] \quad\quad (\text{Equ. 1})$$

The yield of the conversion of $N_2O$ to $NO_x$ (expressed as $N_2O$) is calculated as follows:

$$T(\%) = 100 \left( \frac{[NO_x] \cdot DT}{[N_2O]DE} \right) \quad\quad (\text{Equ. 2})$$

$[N_2O]^*$: dinitrogen oxide concentration after reaction
$[N_2O]$: dinitrogen oxide concentration before reaction

[NO $_x$]*: NO$_x$ concentration (expressed as NO$_2$) after reaction

DT: total flow rate of the gases entering the reactor

DE: flow rate of the gaseous effluent

NM: not measurable; concentration less than or equal to 100 ppm v.

The flow rates of the gases are expressed in cubic meters per hour at atmospheric pressure and at 20° C.

The concentration of the various gases after reaction is expressed in percentages by volume except for unconverted dinitrogen oxide which is expressed in ppm by volume.

The flame is produced by the combustion of natural gas in air.

Examples 1 to 9 are summarised in Table I.

TABLE I

| | Experimental conditions | | | | Analysis of gases after reaction | | | | | Calculations | | |
|---|---|---|---|---|---|---|---|---|---|---|---|---|
| | Flow nat. gas m$^3$/h | Flow air m$^3$/h | Flow N$_2$O m$^3$/h | Flow N$_2$ m$^3$/h | CO$_2$ % v | CO % v | O$_2$ % v | N$_2$O ppm/v | NO$_x$ % v | Flow DT m$^3$/h | R (%) | T (%) |
| 1 | 16 | 147 | 170 | 10 | 4 | 0 | 17 | NM | 3 | 396 | 100 | 7 |
| 2 | 15.2 | 113 | 240 | 21 | 3.7 | 0 | 16.5 | 80 | 2.7 | 479 | 100 | 5.4 |
| 3 | 67 | 657 | 123 | 0 | 9 | 0 | 6.6 | NM | 1 | 774 | 100 | 6.3 |
| 4 | 20.5 | 204 | 105 | 9.3 | 6.7 | 0 | 11.45 | NM | 3.7 | 350 | 100 | 12.3 |
| 5 | 20.7 | 204 | 93 | 9.5 | 6.7 | 0 | 11.52 | NM | 3.9 | 332 | 100 | 14.0 |
| 6 | 25.1 | 258 | 65 | 41 | 7.2 | 0 | 7.8 | NM | 2.8 | 372 | 100 | 16.0 |
| 7 | 25.2 | 252 | 30 | 41 | 8.6 | 0 | 4.7 | NM | 2.25 | 312 | 100 | 23.6 |
| 8 | 20.7 | 214.5 | 25.7 | 41 | 7 | 0 | 6.7 | NM | 2.25 | 273 | 100 | 23.9 |
| 9 | 40.4 | 402 | 32.5 | 38.5 | 9.2 | 0 | 3.6 | NM | 2.35 | 449 | 100 | 32.4 |

We claim:

1. A process for oxidizing N$_2$O to NO$_x$, wherein x is 1 or 2, comprising the steps of:

injecting an initial gaseous mixture comprising N$_2$O, made by oxidizing an organic compound with nitric acid, into a flame or into hot gases produced by said flame to oxidize said N$_2$O to N$_x$ wherein x is 1 or 2; and cooling said NO$_x$, formed from said injecting step, to ambient temperature.

2. A process according to claim 1, further comprising recovering said NO$_x$ from combustion gases formed from said injecting step.

3. A process according to claim 2, wherein said initial gaseous mixture an industrial effluent.

4. A process for oxidizing N$_2$O to NO$_x$, wherein x is 1 or 2, comprising the steps of:

injecting an initial gaseous mixture comprising N$_2$O, made by oxidizing an organic compound with nitric acid, into a flame or into hot gases produced by said flame to oxidize said N$_2$O to NO$_x$ wherein x is 1 or 2;

cooling said NO$_x$, formed from said injecting step, to ambient temperature; and recovering said NO$_x$.

* * * * *